United States Patent Office 2,871,868
Patented Feb. 3, 1959

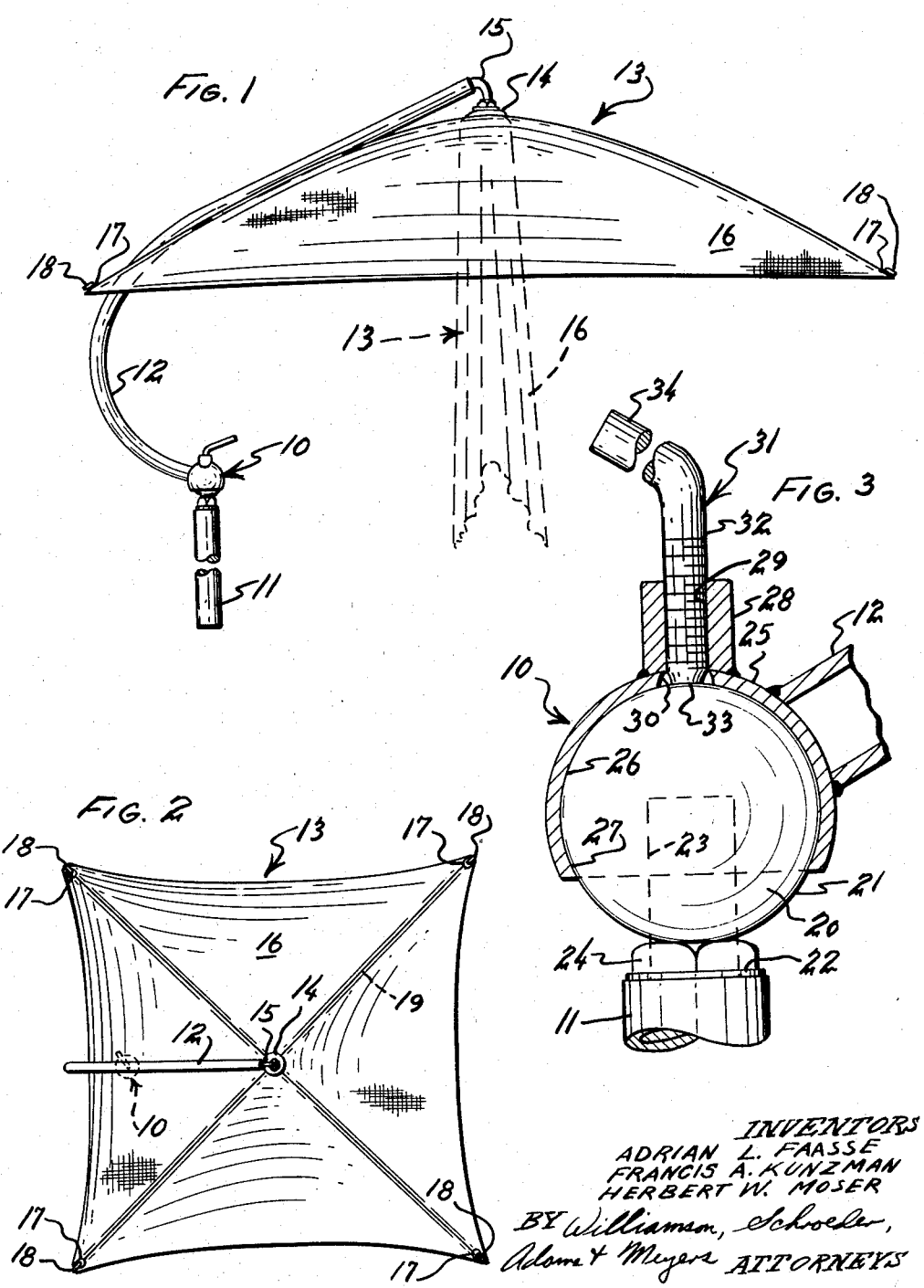

2,871,868

ADJUSTABLE MOUNT

Adrian L. Faasse, Francis A. Kunzman, and Herbert W. Moser, Omaha, Nebr., assignors to Snow Corporation, Omaha, Nebr., a corporation of Nebraska Application January 27, 1955, Serial No. 484,374

3 Claims. (Cl. 135—46)

This invention relates to a mount, and more particularly to an adjustable mount for umbrellas and the like.

In many apparatus and structures, it is often desirable to orient one member with relation to another while keeping the members interconnected. Countless devices have been proposed for this general purpose. Where it is desired to tilt a member relatively in any direction with respect to another, a common device employed for this purpose is a universal joint with tightening means for holding the joint in its adjusted position. An intermediate bracket is pivotally mounted to one member and the other member is then pivotally mounted to the intermediate bracket. The axes of the two pivots are usually at right angles to one another and each can be tightened to frictionally bind against the bracket. Smaller devices of this nature can be maintained in frictional adjustment, but larger and heavier devices require more positive securing means. Now, however, where it is further desired to axially turn the members relative to one another, an additional joint and tightening device must be added to the assembly.

It is an important object of our invention to provide an inexpensive and simple mount which may be easily and quickly adjusted to a multiplicity of oriented positions.

It is another object of the invention to provide a ball and socket type of adjustable mount wherein a single manually actuated member is efficiently positioned to hold the mount at a multiplicity of tilted angulations in any direction of the compass.

It is a further object of the invention to provide a mount which has a simple bearing inner face and which can be easily turned and tilted to any practical position where it can then be locked until further adjustment is desired.

It is a still further object of the invention to provide a mount of the class described which has special adaptation to holding and adjusting an umbrella shade wherein a bowed support is normally secured to the side of the mount and to one side of a medially located locking member and terminates in a reverse curve which supports the shade in adjusted position.

These and other objects and advantages of our invention will more fully appear from the following description made in connection with the accompanying drawings wherein like reference characters refer to the same and similar parts throughout the several views and in which:

Fig. 1 is a side elevation of our mount showing an umbrella shade secured at an upper position thereon, the full line representation indicating open position and the dotted line representation indicating collapsed condition of the shade. Portions of the view are deleted to better illustrate the invention;

Fig. 2 is a reduced top view of the umbrella shade depicted in Fig. 1 and in open condition; and Fig. 3 is an enlarged vertical section of the adjustable mount, portions thereof being shown in full line representation and other portions being cut away to better illustrate the invention.

Referring now more particularly to the drawing, our umbrella mount is indicated generally at 10 and contemplates the employment of a supporting structure consisting of a standard 11 and a supporting arm 12, as shown in Fig. 1. The standard 11 may be an upright member adapted to be secured to a supporting base or to such other member as a bracket formed on the frame of a tractor or the like. The supporting arm 12 is preferably curved in nature and extending outwardly and upwardly from the general longitudinal direction of the standard 11, then reversely curving to the opposite side and above the upper end of the standard. An article such as an umbrella shade 13 may be supported medially of its area at 14 to a terminal fastening 15 disposed at the upper and outer end of support arm 12. Details of the umbrella shade structure particularly adapted for use with our mount are described and claimed in a co-pending application, Serial No. 484,373, filed January 27, 1955, now abandoned.

For purposes of this application, suffice it to say that the umbrella shade 13 comprises a polygonal sheet 16 having peripheral grommeted portions 17 which are attached to fastening elements 18 formed on the outer ends of umbrella spokes 19. The arm 12 may be adapted to curve upwardly over the upper surface of the umbrella shade 13, as shown in Fig. 2.

Referring now to Fig. 3, details of the mount structure itself are there set forth. The mount 10 consists of a ball member 20 which presents, at least for the greater part of its outer area, a spherical bearing surface 21. The ball 20 is preferably constructed of hard material such as steel so that free movement of the parts can be assured. Means such as a threaded connection 22 is provided for securing the ball member 20 to a standard 11. In the form shown, a threaded stud 23 extends axially outward from the end of standard 11 and a lock nut 24 is utilized to secure the stud 23 with respect to ball 20 and the end of standard 11.

A socket member 25 is interconnected with the ball member and has a concave bearing surface 26 which is adapted to lie in bearing engagement with the outer surface 21 of ball 20. The socket member 25 is preferably in continuous bearing engagement with the ball 20 and has an outer annular peripheral margin 27 which constitutes more than a hemisphere in the structure of the socket. This annular peripheral margin 27, therefore, maintains the interconnection between socket 25 and ball 20 so that it cannot become displaced by end thrust in the use and operation of the device.

The supporting arm 12 is preferably tubular in structure and may be welded or otherwise secured to the outer surface of the socket member 25. It is preferred that the supporting arm 12 be located in off-center relation to the socket 25 so that it may extend outwardly and upwardly, as shown in Fig. 1, while the ball and socket mount is in a normal or intermediate position.

Also mounted on the socket and preferably at a central location is an upstanding boss, as shown in Fig. 3. A threaded opening 29 is formed longitudinally of the boss 28 and is aligned with the axis of the annular peripheral margin 27 defined by the opening 30 formed through the wall of the socket 25, said axis lying centrally of the opening and perpendicular to a plane passing through the lower edge of socket 25.

A locking element is shown generally at 31 and is mounted in the socket member within the threaded opening 29—30 so as to have a portion 32 positioned laterally to the spherical bearing surface 21 of the ball 20. The inner end of the lateral portion 32 terminates in a friction head 33 which is adapted to be advanced and retracted toward and away from the bearing surface 21. An off-set handle 34 is formed on the outer end of the lateral portion 32 so that the entire locking element may be manually rotated in its threaded engagement with the boss 28 to effect advancing and retracting of the friction head 33.

In the use and operation of our adjustable mount, the standard 11 is positioned in a supporting bracket (not shown) such as may be secured to the frame of a tractor adjacent the seat of a driver, and the manual handle 34 is turned so as to loosen the socket portion 25 in its bearing contact with the ball 20. The arm 12 is then rotated with respect to the axis of standard 11 so as to bring the upper connecting terminal 15 in central position with the umbrella shade 13 in proper relation to the position of the driver. The supporting arm 12 is then tilted in the proper direction and to the proper degree so as to intercept the angled rays of sunshine or other elements such as wind and rain so as to protect the driver under all circumstances. When properly adjusted, the umbrella shade 13 is then fixed in position by tightening the locking element 31 and advancing the friction head 33 into firm engagement with the hardened outer bearing surface 21 of the ball 20. At the same time that the locking element is tightened, the annular peripheral margin 27 of the socket portion 25 will be drawn upwardly against an annular portion of the bearing surface 21 on ball 20 which is opposed to the bearing area beneath the friction head 33. The peripheral margin 27 will thus exert a cooperative binding effect to maintain the ball and socket in proper adjusted relation. It will be noted that because of the central location of the locking element 31, the socket 25 can be tilted in all directions, limited only by the outer peripheral edge of margin 27 in contact with the connection 22. Since the friction head 33 is located substantially central with respect to this lower periphery, the contact with the ball surface 21 may be effected over a spherical segment of comparatively large area. Since the ball 20 and standard 11 are symmetrical, it is less likely that the friction head 33 will, in a series of adjustments, continuously engage the same spot so as to cause undue wear or indentation of the bearing surface 21. The desirable side location of the support arm 12 does not interfere with the central location of the locking element, and the mechanism handle 34 is also conveniently located for adjustment of the mount at all times.

The particular mount and the curved support arm 12 makes possible the support of an umbrella shade without resorting to a central standard as is customary with umbrellas adapted to be employed with vehicles and the like. This feature is particularly important where it is desired that the user have free vision and free use of his arms and legs in the operation of a vehicle.

It may thus be seen that we have devised an adjustable mount which is extremely simple in structure and yet which may be efficiently employed to orient a member such as an umbrella shade in a multiplicity of positions while maintaining an out of the way position with respect thereto.

It will, of course, be understood that various changes may be made in the form, detail, arrangement and proportion of the parts without departing from the scope of our invention.

What we claim is:

1. In an umbrella having a shade for the protection of persons such as drivers in open vehicles, a mounting structure comprising, a ball member, a standard secured at its upper end to said ball member, a socket member having a concave bearing surface in engagement with the ball member over an area greater than a hemisphere, a supporting arm secured to said socket member and normally positioned laterally to said standard at its juncture with said socket element then curving upwardly and reversely to terminate in a connector, and a locking element mounted on the socket member and having a bearing head extendible therethrough and into engagement with the surface of said ball and normally aligned with the standard and lying in opposed relation to the juncture of said standard and said ball.

2. A mount for an umbrella shade or the like comprising, a ball member presenting at least in part a spherical bearing surface, a socket member interconnected with said ball member and having a concave bearing surface in engagement with the spherical ball surface for greater than a hemispherical portion but less than the bearing surface of the ball member to present an annular retaining surface at the outer periphery of the socket, and an elongated locking element threadedly mounted in the socket member in axial alignment with the axis of the annular retaining surface and extendible through the concave bearing surface into engagement with said spherical bearing surface in opposed relation to the bearing contact of said annular retaining surface whereby to lock the socket member at one of a multiplicity of positions, and an elongated mounting member being rigidly secured in endwise relation outwardly of the socket member at an acute angle with the axis of the annular retaining surface.

3. A mount for an umbrella shade or the like comprising, a substantially spherical ball member having an external bearing surface, a socket member interlockably connected with said ball member and having a concave bearing surface in engagement with the ball member over an area of the ball member somewhat greater than a hemispherical portion thereof and providing an annular retaining surface edgewise at the periphery of the socket, an elongated mounting member secured to said ball member, an elongated locking element threadedly mounted in the socket member and extendible through the concave bearing surface into engagement with said spherical bearing surface of the ball member in opposed relation to the annular retaining surface and in alignment with the axis thereof for locking the socket member at one of a multiplicity of positions with respect to said ball member, and an elongated mounting member secured to the socket member in endwise outwardly extending relation defining an acute angle with the locking element.

References Cited in the file of this patent

UNITED STATES PATENTS

| | | |
|---|---|---|
| 153,943 | Gray | Aug. 11, 1874 |
| 200,945 | Smith | Mar. 5, 1878 |
| 315,224 | Belknap | Apr. 7, 1885 |
| 357,299 | Wright | Feb. 8, 1887 |
| 438,238 | Jefferies et al. | Oct. 14, 1890 |
| 654,051 | Brown et al. | July 17, 1900 |
| 675,106 | Oberle | May 28, 1901 |
| 840,241 | Nootbaar | Jan. 1, 1907 |